(12) United States Patent
Chang

(10) Patent No.: US 8,248,514 B1
(45) Date of Patent: Aug. 21, 2012

(54) CAMERA MODULE HAVING IMAGE SENSING MODULE WITH PASSIVE COMPONENTS

(75) Inventor: Jen-Tsorng Chang, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/441,937

(22) Filed: Apr. 9, 2012

Related U.S. Application Data

(62) Division of application No. 12/730,254, filed on Mar. 24, 2010.

(30) Foreign Application Priority Data

Aug. 21, 2009 (CN) .......................... 2009 1 0305885

(51) Int. Cl.
*H04N 5/225* (2006.01)
(52) U.S. Cl. ....................................................... 348/340
(58) Field of Classification Search .................. 348/340; 438/64, 68
See application file for complete search history.

(56) References Cited

U.S. PATENT DOCUMENTS

| | | | |
|---|---|---|---|
| 7,884,875 B2* | 2/2011 | Kwon et al. | 348/340 |
| 2006/0152615 A1* | 7/2006 | Kwon et al. | 348/340 |
| 2007/0126912 A1* | 6/2007 | De Bruin et al. | 348/340 |
| 2009/0059055 A1* | 3/2009 | Nakano et al. | 348/340 |
| 2009/0122176 A1* | 5/2009 | Wu et al. | 348/340 |
| 2009/0122178 A1* | 5/2009 | Kwon et al. | 348/340 |
| 2009/0322929 A1* | 12/2009 | Webster | 348/340 |

* cited by examiner

*Primary Examiner* — Kelly L Jerabek
(74) *Attorney, Agent, or Firm* — Altis Law Group, Inc.

(57) ABSTRACT

A camera module includes an image sensing module and a lens holder. The image sensing module includes a base defining a top surface and a recess, and a transparent plate mounted on the top surface, the transparent plate covering the recess and having a first surface facing away from the recess. First electrically conductive poles in the transparent plate, second electrically conductive poles, an image sensor in the recess, and passive components attached on the first surface and surrounding the sensor. The sensor includes a light sensitive region and a light non-sensitive region. The second electrically conductive poles are embedded in the light non-sensitive region, and electrically connecting the sensor to the first electrically conductive poles. The passive components are electrically connected to the sensor via the first electrically conductive poles. The lens holder is attached on the top surface of the base and surrounding the transparent plate.

13 Claims, 2 Drawing Sheets

CAMERA MODULE HAVING IMAGE SENSING MODULE WITH PASSIVE COMPONENTS

CROSS REFERENCE

This application is a divisional application of patent application Ser. No. 12/730,254 filed on Mar. 24, 2010 from which it claims the benefit of priority under 35 U.S.C. 120. The patent application Ser. No. 12/730,254 in turn claims the benefit of priority under 35 U.S.C. 119 from Chinese Patent Application 200910305885.5, filed on Aug. 21, 2009.

BACKGROUND

1. Technical Field

The present disclosure relates to optical imaging and particularly, to a camera module having the image sensing module with passive components.

2. Description of Related Art

Image sensing modules are essential devices that have been widely used in camera modules. To allow the image sensing modules to operate, some peripheral electronic components associated with an image sensor are often used together with the image sensor. For example, a passive component is combined to filter output signals from the image sensor, thereby improving the imaging performance and eliminating the crosstalk noise which occurs during signal switching and transmission.

A typical camera module includes an image sensing module, and a lens module. The image sensing module includes a base, an image sensor, and several passive components. The image sensor and the passive components are both disposed on the base and electrically connected to the base. The lens module is mounted on the base, and together with the base forming a receiving cavity for receiving the image sensor and the passive components. However, large amount of the base is normally required to accommodate both the passive components and the image sensor. Therefore, the base must be big enough for mounting the image sensor and the passive components. This structure of the camera module mentioned above conflicts with the tendency for miniaturization of the camera module and the electronic products.

Therefore, what is needed is a compact camera module with the image sensing module, which can overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The embodiments will now be described in detail below with reference to the drawings.

Figure 1:
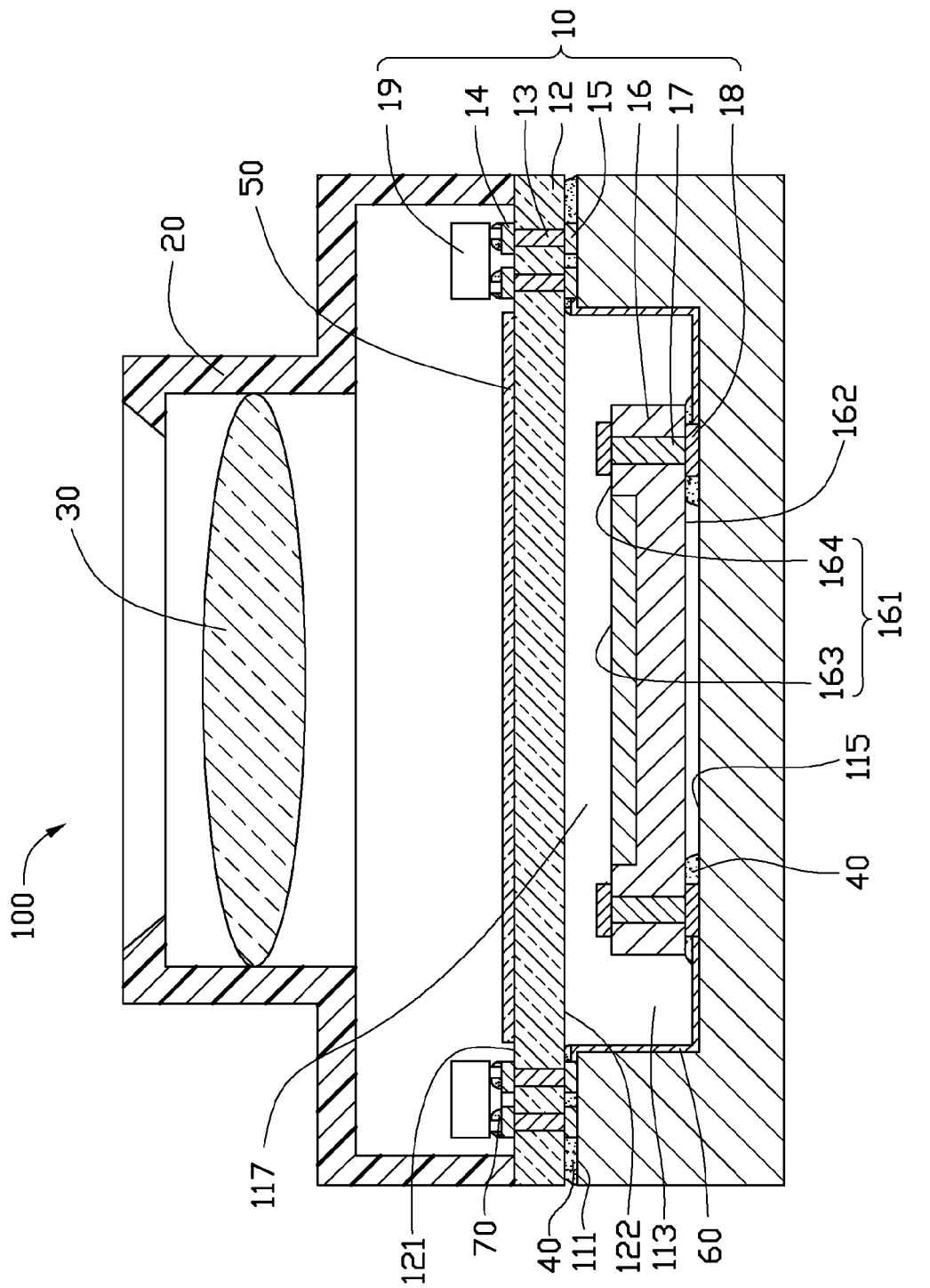
FIG. 1 is a schematic, sectional view of a camera module according to a first embodiment.

FIG. 1, is a camera module 100 according to a first embodiment. The camera module 100 includes an image sensing module 10, and a lens module 20 mounted on the image sensing module 10.

The image sensing module 10 receives light from the lens module 20 and converts the light into electronic image data. The image sensing module 10 includes a base 11, and a transparent plate 12. Embedded in the transparent plate 12 are four first electrically conductive poles 13. Four first electrically conductive pads 14 and four second electrically conductive pads 15 are respectively mounted on the opposite surfaces of the transparent plate 12. An image sensor 16 is mounted on the base 11. Two second electrical conductive poles 17 extend through the image sensor 16, and are electrically connected with the image sensor 16. Two third electrically conductive pads 18 are between the image sensor 16 and the base 11, and mounted on the image sensor 16. Two passive components 19 are mounted on the transparent plate 12, and are electrically connected with the first electrical conductive poles 13.

The base 11, may be made of ceramic, glass, plastic, laminate or other suitable material. The base 11 supports the image sensor 16. The base 11 also includes a top surface 111 for supporting the transparent plate 12. A recess 113 is defined in the top surface 111 of the base 11 for receiving the image sensor 16.

The transparent plate 12 is mounted on the top surface 111 of the base 11 with an adhesive 40, and covers the recess 113, so the transparent plate 12 and the base 11 cooperatively define a receiving cavity 117 receiving the image sensor 16. The transparent plate 12 supports the passive elements 19 and protects the image sensor 16 from being contaminated by exterior conditions. The transparent plate 12 is made of a transparent material such as glass, or quartz, for example. The transparent plate 12 includes a first surface 121 facing away from the recess 113, and an opposite second surface 122 facing the recess 113. The first surface 121 supports the passive components 19. In the present embodiment, an infrared filter 50 is formed on the first surface 121 for preventing infrared light from reaching the image sensor 16. In other embodiments, the infrared filter 50 may instead be formed on the second surface 122.

The first electrical conductive poles 13 surround the image sensor 16, and electrically connect the passive components 19 to the image sensor 16. Two of the first electrical conductive poles 13 extend through the left side of the transparent plate 12, and the other first electrically conductive poles 13 extend through the right side of the transparent plate 12. In the present embodiment, the first electrically conductive poles 13 are made of aluminum. In other embodiments, the first electrically conductive poles 13 may instead be made of silver, copper, for example.

The four first electrically conductive pads 14 are mounted on the first surface 121 of the transparent plate 12. The first electrically conductive pads 14 electrically connect the corresponding first electrically conductive poles 13 to the corresponding passive components 19. In other embodiments, the first electrically conductive pads 14 can be omitted. In such cases, the passive components 19 may be connected electrically with the corresponding first electrically conductive poles 13 with tin solder 70.

The four second electrically conductive pads 15 are mounted on the second surface 122 of the transparent plate 12. The second electrically conductive pads 15 electrically connect the corresponding first electrically conductive poles 13 to the image sensor 16.

The image sensor 16 received in the receiving cavity 117 is a photosensitive element responsive to infrared radiation, ultraviolet radiation, or visible light beams and transforms light signals into electronic signals. The image sensor 16 includes an upper surface 161 and an opposite lower surface 162. The upper surface 161 of the image sensor 16 includes a light sensitive region 163 and a light non-sensitive region 164 surrounding the light sensitive region 163. The lower surface 162 is mounted on the bottom surface 115 of the recess 113 with adhesive 40.

The second electrically conductive poles 17 are embedded in the light non-sensitive region 164, and electrically connect the image sensor 16 to the passive components 19.

The two third electrically conductive pads 18 are mounted on the lower surface 162 of image sensor 16, and connect electrically with the corresponding second electrically conductive poles 17. The third electrically conductive pads 18 are connected electrically with the corresponding second electrically conductive pads 15 by electrically conductive adhesive 60, thereby connecting electrically the second electrically conductive poles 17 to the corresponding first electrically conductive poles 13.

The passive components 19 such as inductors, capacitors or resistors, for example, are attached on the first surface 121, and surround the image sensor 16. The passive components 19 are generally used for improving the transmission quality of image signals output from the image sensor 16. The passive components 19 are connected electrically to the corresponding first electrically conductive pads 14 with tin solder 70, thereby connecting electrically the passive components 19 with the image sensor 16.

In alternative embodiments, the number of the first electrically conductive poles 13, the number of the second electrically conductive poles 17, and the number of the passive components 19 may be three, four, or more, for example.

The lens module 20 is mounted on the first surface 121 of the transparent plate 12, and includes a lens holder 201, and a lens 202 received in the lens holder 201. The lens holder 201 is directly mounted on the first surface 121. Lenses of any number and type could be used in the camera module 100.

In the camera module 100, the base 11 receives the image sensor 16, and the passive components 19 are supported by the transparent plate 12 over the image sensor 16. Therefore, the size of the base 11 can be reduced. Accordingly, the whole camera module 100 using the base 11 can be miniaturized. The image sensor 16 and the passive components 19 are respectively disposed on the two opposite sides of the transparent plate 12. Hence, heat produced by the passive components 19 will not affect normal operation of the image sensor 16, thereby improving the imaging performance of the image sensor 16. In addition, because there is no wire bonding in the image sensing module 10, the image sensing module 10 is more compact. Accordingly the camera module 100 with the image sensing module 10 can be more compact.

Figure 2:
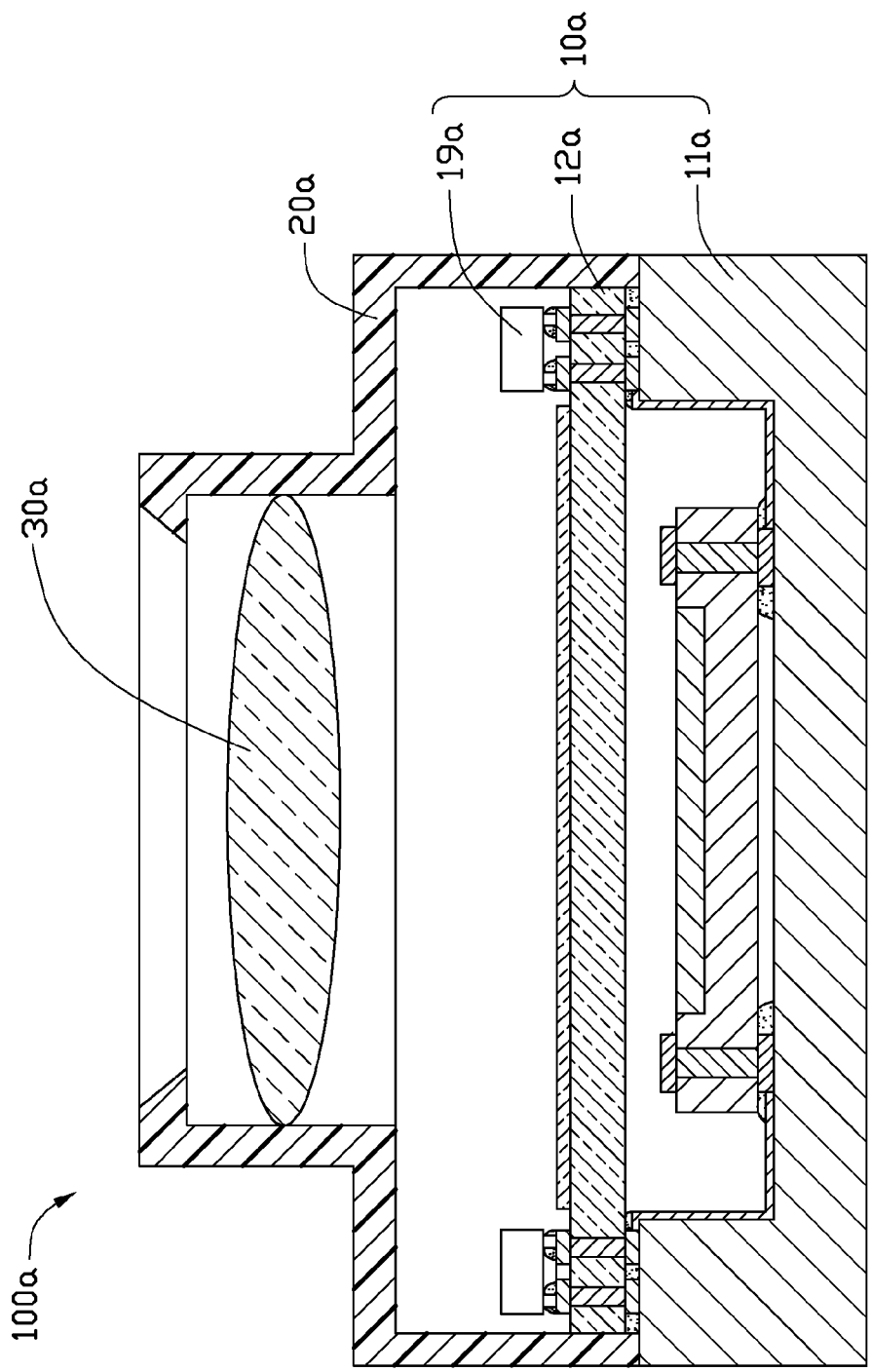
FIG. 2 is a schematic, sectional view of a camera module according to a second embodiment.

Referring to FIG. 2, a camera module 100a similar to the camera module 100, in accordance with a second embodiment, is shown. The camera module 100a includes an image sensing module 10a and a lens module 20a. The lens module 20a includes a lens holder 201a and a lens 202a received in the lens holder 201a.

The image sensing module 10a includes a base 11a, a transparent plate 12a, and two passive components 19a formed on the transparent plate 12a. The lens module 20a is directly mounted on the base 11a, thereby making the lens holder 201a surrounding the transparent plate 12a.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope and spirit of the appended claims.

What is claimed is:

1. A camera module comprising:
   an image sensing module comprising:
      a base comprising a top surface and a recess defined therein;
      a transparent plate mounted on the top surface of the base, the transparent plate covering the recess, and comprising a first surface facing away from the recess;
      a plurality of first electrically conductive poles embedded in the transparent plate;
      a plurality of second electrically conductive poles;
      an image sensor received in the recess of the base, the image sensor comprising a light sensitive region and a light non-sensitive region surrounding the light sensitive region, the second electrically conductive poles being embedded in the light non-sensitive region of the image sensor, and electrically connecting the image sensor to the first electrically conductive poles; and
      a plurality of passive components attached on the first surface of the transparent plate and surrounding the image sensor, the passive components being electrically connected to the image sensor via the first electrically conductive poles; and
   a lens module comprising a lens holder and a lens received in the lens holder, the lens holder attached on the top surface of the base and surrounding the transparent plate.

2. The camera module of claim 1, wherein the image sensing module further comprises a plurality of first electrically conductive pads mounted on the first surface, and the first electrically conductive pads electrically connect the passive components to the corresponding first electrically conductive poles.

3. The camera module of claim 2, wherein the image sensing module further comprises a plurality of second electrically conductive pads mounted on a second surface of the transparent plate opposite to the first surface of the transparent plate, a plurality of third electrically conductive pads mounted on a lower surface of the image sensor, and electrically conductive adhesives applied in the recess, the electrically conductive adhesives electrically connect the third electrically conductive pads to the corresponding second electrically conductive pads, thereby electrically connecting the second electrically conductive poles to the corresponding first electrically conductive poles.

4. The camera module of claim 1, wherein the image sensing module further comprises tin solders electrically connecting the passive components to the corresponding first electrically conductive poles.

5. The camera module of claim 1, wherein the image sensing module further comprises a plurality of first electrically conductive pads mounted on a second surface of the transparent plate opposite to the first surface of the transparent plate, a plurality of second electrically conductive pads mounted on a lower surface of the image sensor, and electrically conductive adhesives applied in the recess, the electrically conductive adhesives electrically connect the first electrically conductive pads to the corresponding second electrically conductive pads, thereby electrically connecting the second electrically conductive poles to the corresponding first electrically conductive poles.

6. The camera module of claim 1, wherein the image sensing module further comprises an infrared filter formed on the transparent plate for preventing infrared light from reaching the image sensor.

7. The camera module of claim 1, wherein the transparent plate is made of a transparent material.

8. The camera module claim 7, wherein the transparent material is selected from the group consisting of glass and quartz.

9. A camera module comprising:
an image sensing module comprising:
- a base comprising a top surface and a recess defined in the top surface;
- a transparent plate mounted on the top surface of the base, the transparent plate covering the recess, and comprising a first surface facing away from the recess;
- a plurality of first electrically conductive poles extending through the transparent plate;
- an image sensor received in the recess of the base, the image sensor being connected electrically to the plurality of first electrically conductive poles;
- a plurality of passive components attached on the first surface of the transparent plate and surrounding the image sensor; and
- tin solders electrically connecting the passive components to the corresponding first electrically conductive poles; and a lens module comprising a lens holder and a lens received in the lens holder, the lens holder attached on the top surface of the base and surrounding the transparent plate.

10. The camera module of claim 9, wherein the image sensing module further comprises a plurality of first electrically conductive pads mounted on a second surface of the transparent plate opposite to the first surface of the transparent plate, a plurality of second electrically conductive pads mounted on a lower surface of the image sensor, and electrically conductive adhesives applied in the recess, the electrically conductive adhesives electrically connect the first electrically conductive pads to the corresponding second electrically conductive pads, thereby electrically connecting the second electrically conductive poles to the corresponding first electrically conductive poles.

11. The camera module of claim 10, wherein the image sensing module further comprises an infrared filter formed on the transparent plate for preventing infrared light from reaching the image sensor.

12. The camera module of claim 9, wherein the transparent plate is made of a transparent material.

13. The camera module claim 9, wherein the transparent material is selected from the group consisting of glass and quartz.

* * * * *